United States Patent
Park et al.

(10) Patent No.: US 8,990,403 B2
(45) Date of Patent: Mar. 24, 2015

(54) METHOD AND APPARATUS FOR RECOMMENDING CONTENT

(75) Inventors: Soo-hong Park, Yongin-si (KR); Cheol-ju Hwang, Yongin-si (KR); Min-ho Lee, Gwacheon-si (KR); Jaw-hwang Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/557,192

(22) Filed: Sep. 10, 2009

(65) Prior Publication Data

US 2010/0106827 A1   Apr. 29, 2010

(30) Foreign Application Priority Data

Oct. 23, 2008   (KR) ........................ 10-2008-0104269

(51) Int. Cl.
   *G06F 15/16*   (2006.01)
   *G06F 17/30*   (2006.01)
   *G06Q 30/02*   (2012.01)

(52) U.S. Cl.
   CPC .......... *G06F 17/30017* (2013.01); *G06Q 30/02* (2013.01)
   USPC ........... 709/227; 709/204; 709/205; 709/206; 709/201; 709/228; 709/229; 709/230; 709/231; 709/237; 709/248; 709/202; 709/203

(58) Field of Classification Search
   USPC ......... 709/227–229, 201–203, 219, 204, 205, 709/206, 230, 231, 237, 248
   See application file for complete search history.

(56) References Cited

U.S. PATENT DOCUMENTS

| | | | |
|---|---|---|---|
| 6,314,451 B1 * | 11/2001 | Landsman et al. | 709/203 |
| 6,697,824 B1 * | 2/2004 | Bowman-Amuah | 709/229 |
| 6,904,449 B1 * | 6/2005 | Quinones | 709/203 |
| 7,209,900 B2 * | 4/2007 | Hunter et al. | 705/58 |
| 7,680,959 B2 * | 3/2010 | Svendsen | 709/248 |
| 7,970,922 B2 * | 6/2011 | Svendsen | 709/231 |
| 2002/0112035 A1 * | 8/2002 | Carey et al. | 709/219 |
| 2003/0037139 A1 * | 2/2003 | Shteyn | 709/225 |
| 2003/0144918 A1 * | 7/2003 | Novelli et al. | 705/26 |
| 2003/0229900 A1 * | 12/2003 | Reisman | 725/87 |
| 2004/0215793 A1 * | 10/2004 | Ryan et al. | 709/229 |
| 2006/0020662 A1 * | 1/2006 | Robinson | 709/203 |
| 2006/0059225 A1 * | 3/2006 | Stonehocker et al. | 709/202 |
| 2006/0095502 A1 * | 5/2006 | Lewis et al. | 709/203 |
| 2006/0218225 A1 * | 9/2006 | Hee Voon et al. | 709/201 |
| 2007/0033292 A1 * | 2/2007 | Sull et al. | 709/238 |
| 2007/0044010 A1 * | 2/2007 | Sull et al. | 715/500.1 |
| 2007/0220081 A1 * | 9/2007 | Hyman | 709/203 |
| 2008/0016205 A1 * | 1/2008 | Svendsen | 709/224 |

(Continued)

OTHER PUBLICATIONS

Bogaards, Peter J. Bogaards, "Metadata and XML—Improving the Findability of Information", EIDC 2004—Wiesbaden, Nov. 10, 2004.*

(Continued)

*Primary Examiner* — Edward Kim
(74) *Attorney, Agent, or Firm* — Sughrue Mion, PLLC (57) ABSTRACT

Provided is a content recommending method including receiving from second users meta data regarding content belonging to each of the second users having a content preference similar to a content preference of a first user, detecting based on the received meta data a plurality of pieces of recommended content similar to content that the first user is currently using, and outputting information regarding the respective pieces of detected recommended content.

26 Claims, 4 Drawing Sheets

(56) References Cited

U.S. PATENT DOCUMENTS

| | | | |
|---|---|---|---|
| 2008/0052371 A1* | 2/2008 | Partovi et al. | 709/217 |
| 2008/0140849 A1* | 6/2008 | Collazo | 709/229 |
| 2008/0155109 A1* | 6/2008 | Khedouri et al. | 709/229 |
| 2008/0162655 A1* | 7/2008 | Khedouri et al. | 709/206 |
| 2008/0183794 A1* | 7/2008 | Georgis et al. | 709/201 |
| 2008/0319833 A1* | 12/2008 | Svendsen | 705/10 |
| 2009/0055759 A1* | 2/2009 | Svendsen | 715/764 |
| 2009/0083362 A1* | 3/2009 | Svendsen | 709/201 |
| 2009/0164514 A1* | 6/2009 | Svendsen et al. | 707/104.1 |
| 2010/0106827 A1* | 4/2010 | Park et al. | 709/224 |
| 2012/0072610 A1* | 3/2012 | Svendsen | 709/231 |

OTHER PUBLICATIONS

Bogaards, Peter J. Bogaards, "Metadata and XML—Improving the Findability of Information", EIDC 2005—Wiesbaden, Nov. 10, 2004.*

Ragno et al. ("Inferring similarity between music objects with application to playlist generation", MIR'05 Proceedings of the 7th ACM SGIMM international workshop on Multimedia information retrieval, p. 73-80, ISBN:1-59593-244-5.*

Kortuem, "When peer-to-peer comes face-to-face: collaborative peer-to-peer copmuting in mobile ad-hoc networks", Aug. 2001, Peer-to-Peer Compting, 2001, Proceedings, First International Conference, p. 75-91.*

* cited by examiner

METHOD AND APPARATUS FOR RECOMMENDING CONTENT

CROSS-REFERENCE TO RELATED PATENT APPLICATION

This application claims priority from Korean Patent Application No. 10-2008-0104269, filed on Oct. 23, 2008, in the Korean Intellectual Property Office (KIPO), the disclosure of which is incorporated herein in its entirety by reference.

BACKGROUND OF THE INVENTION

1. Field of the Invention

Apparatuses and methods consistent with the present invention relate to a method and apparatus for recommending content.

2. Description of the Related Art

As use of the Internet becomes more widespread, the total number of contents that a user can access exponentially increases. An increase in the total number of contents that a user can access has triggered development of a technique of recommending content that a user may prefer in order to assist the user in selecting content.

For example, such a recommending technique may be provided based on the operation of a server. When a user uses a plurality of pieces of content provided from a predetermined server over a predetermined time, the server may store the history of the used content and recommend content that the user may prefer by analyzing the stored history.

More specifically, if a user mainly purchases books related to psychology from an online book store over a predetermined period of time, a server linked to the online book store may store the history of the user's purchases and recommend bestselling books related to psychology when the user wants to receive such a recommendation.

SUMMARY OF THE INVENTION

Exemplary embodiments of the present invention provide a method and apparatus for recommending content.

According to an exemplary embodiment of the present invention, there is provided a method of recommending content to a first user by using second users in a peer-to-peer (P2P) network, the method including receiving from the second users meta data regarding content belonging to the second users having a content preference similar to a content preference of the first user; detecting a plurality of pieces of recommended content similar to content that the first user is currently using, based on the received meta data; and outputting information regarding the respective pieces of detected recommended content.

The detecting of the plurality of pieces of recommended content may include detecting the pieces of recommended content by searching the received meta data for content, which is similar to the content that the first user is currently using in terms of at least one of a title and a genre, from among the content of the second users.

The second users may be determined based on a list of related users. The list of related users may include users in the P2P network having a content usage history similar to a content usage history of the first user.

The method may further include checking the content usage history of the first user; detecting third users in the P2P network having a content usage history similar to the checked content usage history of the first user; and updating the list of related users by using the detected third users.

The checking of the content usage history of the first user may be performed periodically.

The outputting of the information regarding the detected pieces of recommended content may include arranging the information regarding the respective pieces of recommended content and sequentially outputting the information according to a priority determined based on a content usage history of the first user.

The priority may be determined in such a way that a high priority is assigned to a genre and a format of content that is relatively frequently used, based on the content usage history of the first user.

The second users may belong to at least one of a plurality of second user groups which are classified according to a predetermined criterion, and the detecting of the pieces of recommended content may include detecting the pieces of recommended content in units of the classified second user groups.

Content that the first user is currently using may include at least one content format selected from among images, audio, video and text formats.

According to another exemplary embodiment of the present invention, there is provided an apparatus for recommending content to a first user by using second users in a P2P network, the apparatus including a receiving unit receiving from the second users meta data regarding content belonging to the second users having a content preference similar to a content preference of the first user; a detection unit detecting a plurality of pieces of recommended content similar to content that the first user is currently using, based on the received meta data; and an output unit outputting information regarding the respective pieces of detected recommended content.

The apparatus may further include a storage unit storing the content usage history of the first user and the list of related users; a checking unit checking the stored content usage history of the first user; and an updating unit updating the list of related users by using third users when the third users having a content usage history similar to the checked content usage history of the first user are detected in the P2P network According to another exemplary embodiment of the present invention, there is provided a computer readable recording medium having recorded thereon a computer program for executing a method of recommending content to a first user by using second users in a P2P network, the method including receiving from the second users meta data regarding content belonging to the second users having a content preference similar to a content preference of the first user; detecting a plurality of pieces of recommended content similar to content that the first user is currently using, based on the received meta data; and outputting information regarding the respective pieces of detected recommended content.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in greater detail with reference to the accompanying drawings.

Figure 1:
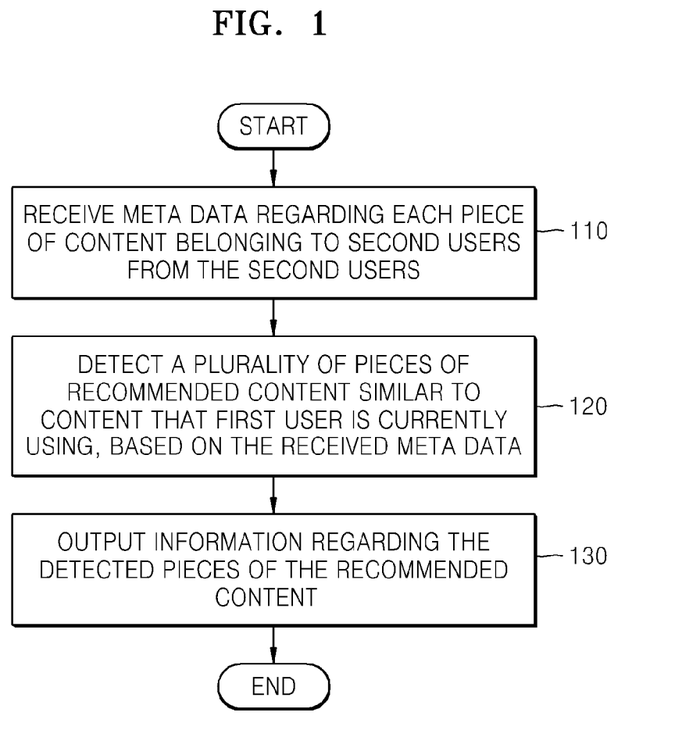
FIG. 1 is a flowchart illustrating a method of recommending content according to an exemplary embodiment of the present invention.

FIG. 1 is a flowchart illustrating a method of recommending content according to an exemplary embodiment of the present invention. In operation 110, meta data regarding each piece of content belonging to second users who have a content preference similar to a content preference of a first user, is received from the second users.

The meta data of each piece of the content belonging to the second users may include a title and genre of the content.

For example, if one of the second users has content regarding a movie, meta data of the content may include title information of the movie and genre information indicating whether the movie is a comedy or a melodrama. The meta data may further include the names of the actors appearing in the movie, information regarding the director of the movie, and so on.

Also, if the second user further has other content regarding an electronic book, meta data of the content may include title information of the book, genre information indicating whether the book is related to history or art, and information regarding the author of the book.

The second users may be determined based on a list of related users.

The list of related users includes at least one user who has a content usage history similar to a content usage history of the first user in a peer-to-peer (P2P) network. Thus the second users are listed in the list of related users.

However, the second users are not limited to the list of related users, and may be determined by detecting users who have a content preference similar to the content preference of the first user in the P2P network in real time, regardless of the list of related users.

Otherwise, the first user may determine his/her friends or other desired persons as the second users.

The above meta data may be received periodically or whenever recommended content needs to be detected.

In operation 120, the first user detects a plurality of pieces of recommended content similar to content that the first user is currently using, based on the received meta data.

For example, if the content that the first user is currently using is a moving picture related to the Olympics held in Korea, it is possible to detect recommended content, such as content regarding books related to Korea or the Olympics, content related to movies regarding Korea or the Olympics, or content regarding recommended destinations in Korea or other Olympic host countries, by searching the received meta data.

The content that the first user is currently using may have at least one content format selected from among images, audio, video and text formats.

In an exemplary embodiment, a plurality of pieces of recommended content are detected by using meta data provided from second users connected to a first user in a P2P network rather than meta data provided from a specific server. Thus the first user does not have to access a specific server and store the content usage history of the specific server or other information regarding the first user in the specific server.

In operation 130, information regarding the detected pieces of the recommended content is output.

The information regarding the pieces of the recommended content may include title information and genre information of the pieces of the recommended content.

The information regarding the pieces of the recommended content may be arranged and sequentially output according to a priority which is determined based on the content usage history of the first user.

The priority may be determined in such a way that a high priority is assigned to the genre and format of content being relatively frequently used, based on the content usage history of the first user.

For example, if the pieces of the recommended content are related to movies and the first user viewed moving-picture content belonging to an action movie genre more frequently than moving-picture content belonging to a comic movie genre, then a high priority is assigned to the moving picture content belonging to the action movie genre.

Also, if the first user used moving-picture content more frequently than text content, a high priority is assigned to the moving-picture content.

Figure 2:
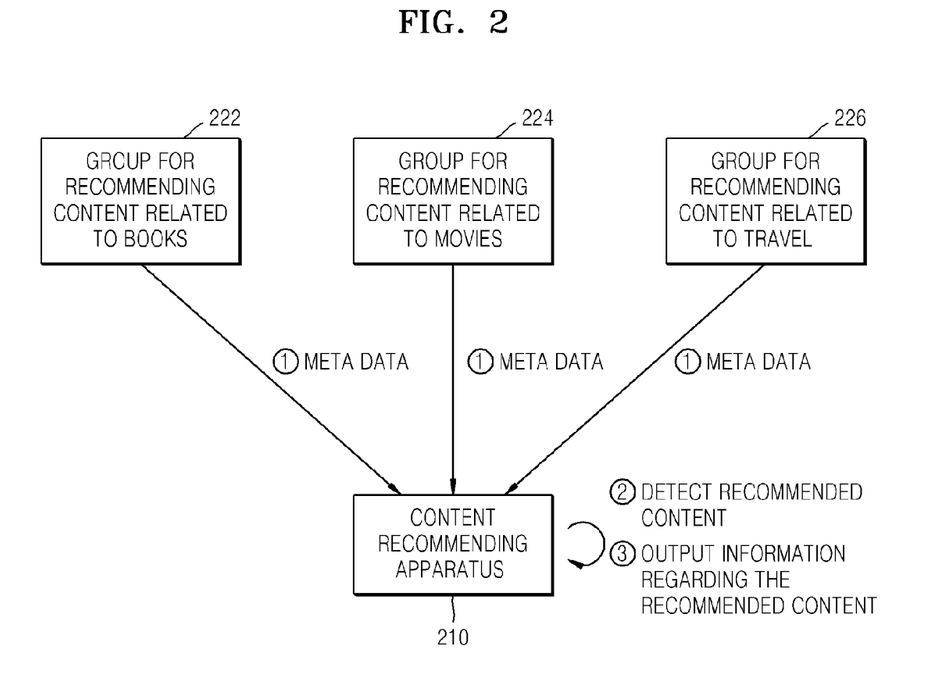
FIG. 2 is a block diagram illustrating a method of recommending content according to an exemplary embodiment of the present invention.

FIG. 2 is a block diagram illustrating a method of recommending content according to an exemplary embodiment of the present invention. In operation 1, a content recommending apparatus 210 according to an exemplary embodiment of the present invention receives meta data of each piece of content belonging to each of a plurality of second user groups 222, 224, and 226, from the second user groups 222, 224 and 226.

Second users are classified into the second user group 222 for recommending content related to books, the second user group 224 for recommending content related to movies, and the second user group 226 for recommending content related to travel. The second user group 222 may include second users who have a preference similar to the first user's preference regarding books, the second user group 224 may include second users who have a preference similar to the first user's preference regarding movies, and the second user group 226 may include second users who have a preference similar to the first user's preference regarding travel.

Here, a criterion for classifying the second user groups 222, 224 and 226 may be determined according to the first user.

For example, the first user may classify the second users into a second user group for recommending content related to games, and a second user group for recommending content related to animation.

In operation 2, the content recommending apparatus 210 detects recommended content by detecting content, which is similar to content that the first user is currently using in terms of at least one of title and genre, based on the meta data received from the respective second user groups 222, 224 and 226.

The content recommending apparatus 210 may detect recommended content in units of the second user groups 222, 224 and 226.

For example, the content recommending apparatus 210 may search the meta data received from the second user group 222 for recommended content related to books, search the meta data received from the second user group 224 for recommended content related to movies, and search the meta data received from the second user group 226 for recommended content related to travel.

If recommended content is detected in units of the second user groups 222, 224 and 226 as described above, the content recommending apparatus 210 may more efficiently or accurately recommend content that satisfies the first user's preference for content to the first user than when the second users are not classified into a plurality of groups.

For example, if recommended content is detected without classifying the second users into a plurality of groups, the content recommending apparatus 210 may detect recommended content related to movies based on meta data received from second users who have a preference for books similar to the first user's preference. Even a second user who has a content preference for books similar to the first user's content preference may have a content preference for movies different from the first user's content preference, and thus content that the first user does not have a preference for may be recommended in this case.

However, operation 2 is just one exemplary embodiment of the present invention and the present invention is not limited thereto, and thus the content recommending apparatus 210 may receive meta data regarding content that is not classified into a plurality of groups, from second users.

In operation 3, the content recommending apparatus 210 outputs information regarding the detected recommended content.

For example, when the content recommending apparatus 210 outputs information regarding recommended content related to books, meta data received from the second user group 222 for recommending content related to books may be searched to detect recommended content and then information regarding the detected recommended content may be output.

The information regarding the detected recommended content related to books may include either the title information of books related to the content that the first user is currently using or title information of moving-picture content introducing such books.

That is, the recommended content related to books may include not only text type content, e.g., electronic books, but also various type content (images, audio, video, etc.) related to the books.

The first user's content preference is not fixed but may be changed as time goes by. For example, the first user who originally prefers action movies may change and prefer melodramas to action movies and thus view melodramas more frequently than action movies.

If a content preference changes, second users used for recommending content should also be changed. This is because content recommended based on content belonging to the existing second users may be unavailable to the first user whose content preference changes.

Figure 3:
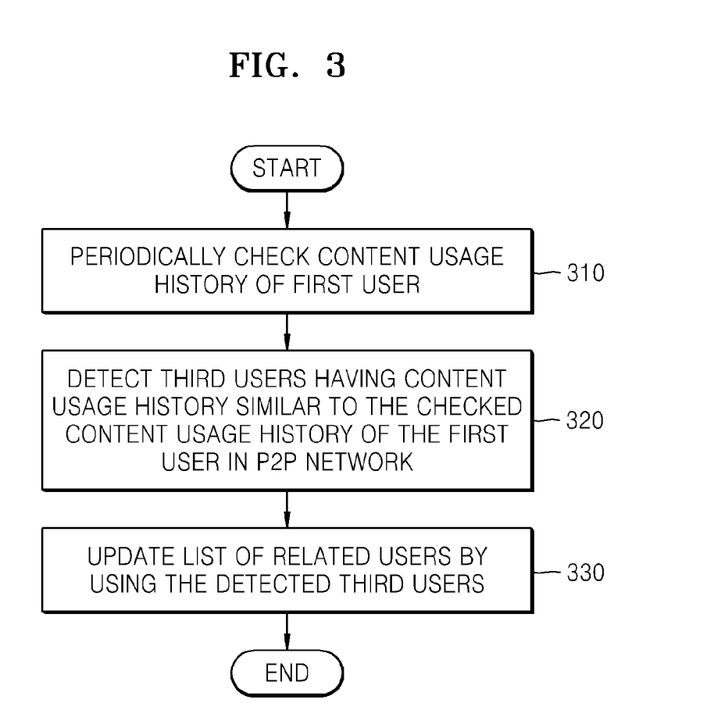
FIG. 3 is a flowchart illustrating a method of updating a list of related users according to an exemplary embodiment of the present invention.

FIG. 3 is a flowchart illustrating a method of updating a list of related users according to an exemplary embodiment of the present invention. In operation 310, a content usage history of a first user is periodically checked. The reason for periodically checking the content usage history of the first user is to update the list of related users based on a point of time when the content usage history is checked.

In operation 320, third users having a content usage history similar to the checked content usage history of the first user are detected in a P2P network.

If the content usage history of the first user is not significantly changed when the checking is performed, the detected third users may be considered to be almost the same as the existing second users.

However, if the content usage history of the first user is significantly changed during updating, i.e., if a content preference of the first user is significantly changed, the detected third users may be completely different from the existing second users.

In operation 330, the list of related users is updated using the detected third users.

After the list of related users is updated, the content recommending apparatus 210 of FIG. 2 detects recommended content based on meta data regarding content of the respective third users listed in the updated list of related users.

In another exemplary embodiment, instead of additionally managing a list of related users, second users having a content preference similar to the content preference of the first user may be newly detected whenever recommended content needs to be detected and recommended content may be detected based on meta data received from the newly detected second users.

Figure 4:
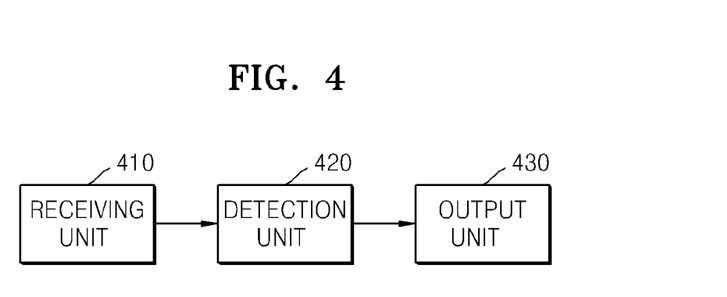
FIG. 4 is a block diagram of an apparatus for recommending content according to an exemplary embodiment of the present invention.

FIG. 4 is a block diagram of an apparatus for recommending content according to an exemplary embodiment of the present invention. Referring to FIG. 4, the content recommending apparatus includes a receiving unit 410, a detection unit 420, and output unit 430.

The receiving unit 410 receives, from second users, meta data regarding content belonging to the second users whose content preference is similar to a content preference of a first user.

The receiving unit 410 may periodically receive meta data or may receive the meta data only when it is necessary to detect recommended content.

The detection unit 420 detects recommended content similar to content that the first user is currently using, based on the meta data received from the receiving unit 410.

The output unit 430 outputs information regarding the recommended content detected by the detection unit 420.

Figure 5:
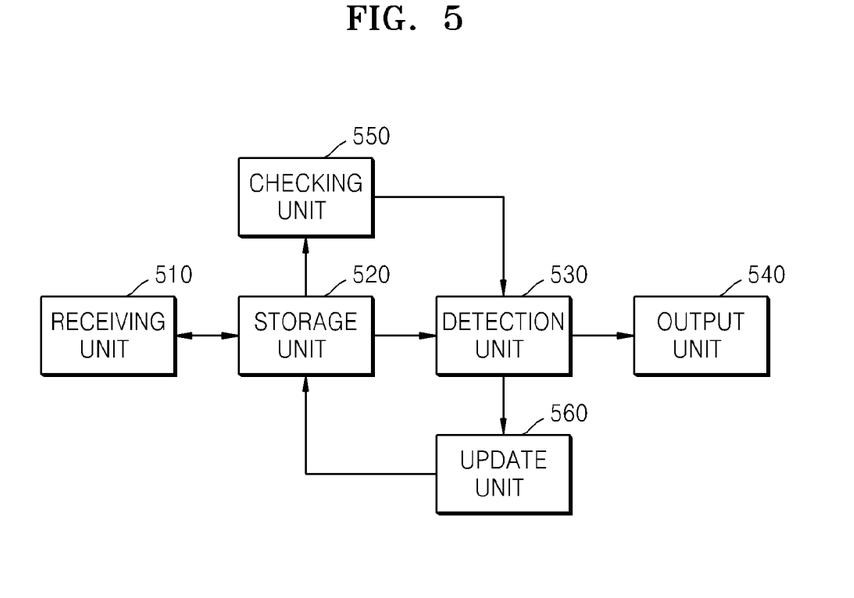
FIG. 5 is a block diagram of an apparatus for recommending content according to another exemplary embodiment of the present invention.

FIG. 5 is a block diagram of an apparatus for recommending content according to another exemplary embodiment of the present invention. Referring to FIG. 5, the content recommending apparatus includes a receiving unit 510, a storage unit 520, a detection unit 530, an output unit 540, a checking unit 550, and an update unit 560.

The receiving unit 510 reads a list of related users from the storage unit 520, and receives meta data regarding content belonging to respective second users listed in the list of related users, from the second users.

The storage unit 520 stores the list of related users, and stores the meta data received from the receiving unit 510.

The detection unit 530 reads the meta data from the storage unit 520, and detects recommended content based on the read meta data.

If the checking unit 550 periodically checks a content usage history of a first user stored in the storage unit 520, the detection unit 530 detects third users having a content usage history similar to the checked content usage history of the first user in a P2P network.

The update unit 560 updates the list of related users by using the third users detected by the detection unit 530.

In this case, the update unit 560 may update the existing list of related users stored in the storage unit 520 by overwriting the existing list of related users by a new list of related users generated using the third users.

If the updated list of related users is stored in the storage unit 520, the receiving unit 510 reads the updated list of related users from the storage unit 520, and receives meta data regarding content belonging to each of the third users listed in the read list of related users from the third users.

Next, the detection unit 530 detects recommended content based on the meta data received from the third users, and the output unit 540 outputs information regarding the recommended content detected by the detection unit 530.

The above exemplary embodiments of the present invention may be embodied as a computer program. The computer program may be stored in a computer readable recording medium, and executed using a general digital computer. Examples of the computer readable medium include a magnetic recording medium (a ROM, a floppy disc, a hard disc, etc.), and an optical recording medium (a CD-ROM, a DVD, etc.).

Alternatively, other exemplary embodiments of the present invention may be embodied as a computer program and the computer program may be transmitted by means of a computer readable transmission medium and executed using a general digital computer, the computer readable transmission medium being carrier waves (such as in transmission over the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of recommending content to a first user by using one or more second users in a peer-to-peer (P2P) network implemented by a processor, the method comprising:
receiving, via the P2P network from the one or more second users meta data regarding content belonging to the one or more second users;
detecting a plurality of pieces of recommended content similar to content that the first user is currently using, based on both the received meta data and the content that the first user is currently using, by searching the received metadata from the one or more second users for the plurality of pieces of recommended content which are similar to the content that the first user is currently using; and
outputting information regarding respective pieces of the detected recommended content,
wherein the one or more second users have a content preference similar to a content preference of the first user,
wherein the information regarding the recommended content is included in the metadata received from the one or more second users,
wherein the one or more second users belong to at least one of a plurality of second user groups which are classified according to a classification criterion,
wherein the detecting the pieces of recommended content comprises detecting the pieces of recommended content according to the classified second user groups, and
wherein a first group among the plurality of second user groups includes users that have preference similar to the first user preference relating to a first classification criterion selected by the first user for recommending a first type of content, and a second group among the plurality of second user groups includes users that have preference similar to the first user preference relating to a second classification criterion selected by the first user for recommending a second type of content.

2. The method of claim 1, wherein the detecting the plurality of pieces of recommended content comprises detecting the pieces of recommended content by searching the received meta data for content which is similar to the content that the first user is currently using in terms of at least one of a title and a genre.

3. The method of claim 1, wherein the one or more second users are determined based on a list of related users, and
wherein the list of related users comprises users having a content usage history similar to a content usage history of the first user.

4. The method of claim 3, further comprising:
checking the content usage history of the first user;
detecting one or more third users in the P2P network having a content usage history similar to the checked content usage history of the first user; and
updating the list of related users by using the one or more detected third users.

5. The method of claim 4, wherein the checking the content usage history of the first user is performed periodically.

6. The method of claim 1, wherein the outputting the information regarding the respective pieces of detected recommended content comprises arranging the information regarding the respective pieces of detected recommended content and sequentially outputting the arranged information according to a priority determined based on a content usage history of the first user.

7. The method of claim 6, wherein the priority is determined by assigning a high priority to a genre and a format of content that is frequently used, based on the content usage history of the first user.

8. The method of claim 1, wherein the content that the first user is currently using comprises at least one content format selected from among images, audio, video and text formats.

9. An apparatus for recommending content to a first user by using one or more second users in a peer-to-peer (P2P) network, the apparatus comprising:
a receiving unit which receives, via the P2P network, from the one or more second users, meta data regarding content belonging to the one or more second users;
a detection unit, implemented on a processor, which detects a plurality of pieces of recommended content similar to content that the first user is currently using, based on both the received meta data and the content that the first user is currently using, by searching the received metadata from the one or more second users for the plurality of pieces of recommended content which are similar to the content that the first user is currently using; and
an output unit which outputs information regarding respective pieces of the detected recommended content,
wherein the one or more second users have a content preference similar to a content preference of the first user,
wherein the information regarding the recommended content is included in the metadata received from the one or more second users,
wherein the one or more second users belong to at least one of a plurality of second user groups which are classified according to a classification criterion,
wherein the detection unit detects the pieces of recommended content according to the classified second user groups, and
wherein a first group among the plurality of second user groups includes users that have preference similar to the first user preference relating to a first classification criterion selected by the first user for recommending a first type of content, and a second group among the plurality of second user groups includes users that have preference similar to the first user preference relating to a second classification criterion selected by the first user for recommending a second type of content.

10. The method of claim 1, wherein the classification criterion is determined by the first user.

11. The method of claim 1, wherein the classification criterion includes one of books, music, movies, and travel.

12. The apparatus of claim 9, wherein the detection unit detects the pieces of recommended content by searching the received meta data for content which is similar to the content that the first user is currently using in terms of at least one of a title and a genre.

13. The apparatus of claim 9, wherein the one or more second users are determined based on a list of related users, and
wherein the list of related users comprises users having a content usage history similar to a content usage history of the first user.

14. The apparatus of claim 13, further comprising:
a storage unit which stores the content usage history of the first user and the list of related users;
a checking unit which checks the stored content usage history of the first user; and
an updating unit which updates the list of related users by using third users in the P2P network having a content usage history similar to the checked content usage history of the first user, when the third users are detected in the P2P network.

15. The apparatus of claim 14, wherein the checking unit periodically checks the content usage history of the first user.

16. The apparatus of claim 9, wherein the outputting unit arranges the information regarding the respective pieces of detected recommended content and sequentially outputs the arranged information according to a priority determined based on a content usage history of the first user.

17. The apparatus of claim 16, wherein the priority is determined by assigning a high priority to a genre and a format of content that is frequently used, based on the content usage history of the first user.

18. The apparatus of claim 9, wherein the content that the first user is currently using comprises at least one content format selected from among images, audio, video and text formats.

19. A non-transitory computer readable recording medium having recorded thereon a computer program for executing a method of recommending content to a first user by using one or more second users in a peer-to-peer (P2P) network, the method comprising:
receiving, via the P2P network, from the one or more second users, meta data regarding content belonging to the one or more second users;
detecting a plurality of pieces of recommended content similar to content that the first user is currently using, based on both the received meta data and the content that the first user is currently using, by searching the received metadata from the one or more second users for the plurality of pieces of recommended content which are similar to the content that the first user is currently using; and
outputting information regarding respective pieces of the detected recommended content,
wherein the one or more second users have a content preference similar to a content preference of the first user,
wherein the information regarding the recommended content is included in the metadata received from the one or more second users,
wherein the one or more second users belong to at least one of a plurality of second user groups which are classified according to a classification criterion,
wherein the detecting the pieces of recommended content comprises detecting the pieces of recommended content according to the classified second user groups, and
wherein a first group among the plurality of second user groups includes users that have preference similar to the first user preference relating to a first classification criterion selected by the first user for recommending a first type of content, and a second group among the plurality of second user groups includes users that have preference similar to the first user preference relating to a second classification criterion selected by the first user for recommending a second type of content.

20. A method of recommending content for a first user implemented by a processor, the method comprising:
retrieving, via the P2P network, meta data regarding content belonging to a plurality of second users, from the plurality of second users;
detecting at least one piece of recommended content similar to content that the first user is currently using, based on both the meta data retrieved from the plurality of second users and the content that the first user is currently using, by searching the retrieved metadata from the plurality of second users for the plurality of pieces of recommended content which are similar to the content that the first user is currently using; and
outputting information corresponding to the detected at least one piece of the recommended content,
the plurality of second users belong to at least one of a plurality of second user groups which are classified according to a classification criterion, and
the detecting the pieces of recommended content comprises detecting the pieces of recommended content according to the classified second user groups,
wherein a first group among the plurality of second user groups includes users that have preference similar to the first user preference relating to a first classification criterion selected by the first user for recommending a first type of content, and a second group among the plurality of second user groups includes users that have preference similar to the first user preference relating to a second classification criterion selected by the first user for recommending a second type of content,
wherein the information regarding the recommended content is included in the metadata received from the plurality of second users.

21. The method of claim 20, wherein the plurality of second users share a common content preference with the first user.

22. The method of claim 20, wherein the plurality of second users are determined based on a content preference of the first user.

23. The method of claim 20, further comprising:
generating a list of related users, the list of related users comprising the plurality of second users from which the meta data is retrieved,
wherein the plurality of second users share a common content preference with the first user.

24. The method of claim 20, wherein the first user and the plurality of second users belong to a same peer-to-peer (P2P) network.

25. The method of claim 20, wherein the detecting the at least one piece of recommended content comprises detecting the at least one piece of recommended content by searching the retrieved meta data for content which is similar to content that the first user is currently using.

26. The method of claim 25, wherein the searching the retrieved meta data for content which is similar to content that the first user is currently using is performed based on at least one of a title and a genre.

* * * * *